(No Model.) 11 Sheets—Sheet 1.

H. E. HARBAUGH.
CIRCULAR KNITTING MACHINE.

No. 513,707. Patented Jan. 30, 1894.

Witnesses,
S. T. Mann,
R. J. Jacker.

Inventor,
Howard E. Harbaugh
By T. T. Morrison
Atty;

(No Model.) 11 Sheets—Sheet 2.

H. E. HARBAUGH.
CIRCULAR KNITTING MACHINE.

No. 513,707. Patented Jan. 30, 1894.

Witnesses,

Inventor,
Howard E. Harbaugh.

(No Model.)  
11 Sheets—Sheet 3.

H. E. HARBAUGH.
CIRCULAR KNITTING MACHINE.

No. 513,707.  
Patented Jan. 30, 1894.

Witnesses:  
F. S. Mann  
R. J. Jacker

Inventor:  
Howard E. Harbaugh,  
By F. S. Morrison  
Attys

(No Model.)

H. E. HARBAUGH.
CIRCULAR KNITTING MACHINE.

No. 513,707. Patented Jan. 30, 1894.

Witnesses:

Inventor:
Howard E. Harbaugh
By D. S. Morrison
Atty.

(No Model.) 11 Sheets—Sheet 6.
H. E. HARBAUGH.
CIRCULAR KNITTING MACHINE.

No. 513,707. Patented Jan. 30, 1894.

(No Model.) 11 Sheets—Sheet 7.

H. E. HARBAUGH.
CIRCULAR KNITTING MACHINE.

No. 513,707. Patented Jan. 30, 1894.

Witnesses:
F. F. Mann
R. J. Jacker

Inventor,
Howard E. Harbaugh
By F. F. Morrison,
Attys.

THE NATIONAL LITHOGRAPHING COMPANY,
WASHINGTON, D. C.

(No Model.) 11 Sheets—Sheet 8.

H. E. HARBAUGH.
CIRCULAR KNITTING MACHINE.

No. 513,707. Patented Jan. 30, 1894.

Witnesses:
Inventor:
Howard E. Harbaugh

(No Model.)  11 Sheets—Sheet 9.

H. E. HARBAUGH.
CIRCULAR KNITTING MACHINE.

No. 513,707. Patented Jan. 30, 1894.

(No Model.)  11 Sheets—Sheet 10.
H. E. HARBAUGH.
CIRCULAR KNITTING MACHINE.

No. 513,707. Patented Jan. 30, 1894.

Witnesses:  Inventor:

(No Model.) 11 Sheets—Sheet 11.

H. E. HARBAUGH.
CIRCULAR KNITTING MACHINE.

No. 513,707. Patented Jan. 30, 1894.

Witnesses:
D. F. Mann,
R. J. Jaeker.

Inventor,
Howard E. Harbaugh
By D. F. Morrison
Attys.

UNITED STATES PATENT OFFICE.

HOWARD E. HARBAUGH, OF ROCKFORD, ILLINOIS, ASSIGNOR, BY MESNE ASSIGNMENTS, TO THE CHICAGO-ROCKFORD HOSIERY COMPANY, OF KENOSHA, WISCONSIN.

CIRCULAR-KNITTING MACHINE.

SPECIFICATION forming part of Letters Patent No. 513,707, dated January 30, 1894.

Application filed January 21, 1892. Serial No. 418,860. (No model.)

*To all whom it may concern:*

Be it known that I, HOWARD E. HARBAUGH, a citizen of the United States, residing at Rockford, in the county of Winnebago and State of Illinois, have invented certain new and useful Improvements in Circular-Knitting Machines, of which the following is a specification.

The object of my invention is the improvement of the knitting-machine shown and described in the specification and drawings of Letters Patent of the United States, No. 440,415, granted to John R. Bridges, November 11, 1890.
My invention consists, first, in improving the general construction of said knitting-machine; second, in providing means for knitting the heels and toes of stockings on said knitting-machine, without leaving a series of openings along the center line of the gusset-seams thereof, as Bridges' machine does, when constructed and operated as contemplated in the specification and drawings of his said patent; and, third, in providing means for regulating the knitting-cams of the machine so as to cause it to knit the different parts of stockings more or less tightly, according as required.

Referring to the accompanying drawings, which form a part of this specification,
Figs. 29, 30, 31 and 32 are elevations and top plan views of reciprocatory rings, the functions of which will be fully explained hereinafter.

Like letters and figures of reference indicate corresponding parts throughout the several views.

Figure 1:
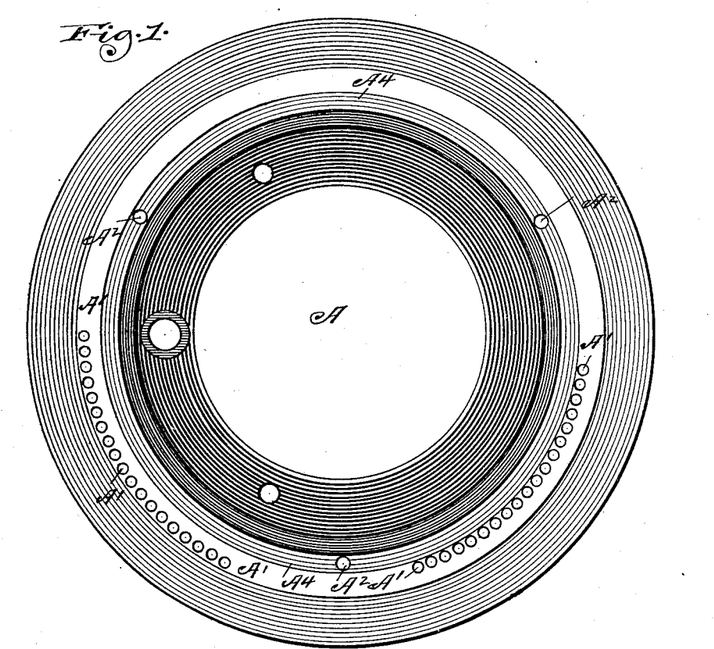
Figure 1 is a top plan view of the base of the machine.
Figures 2, 5, 6, 7:
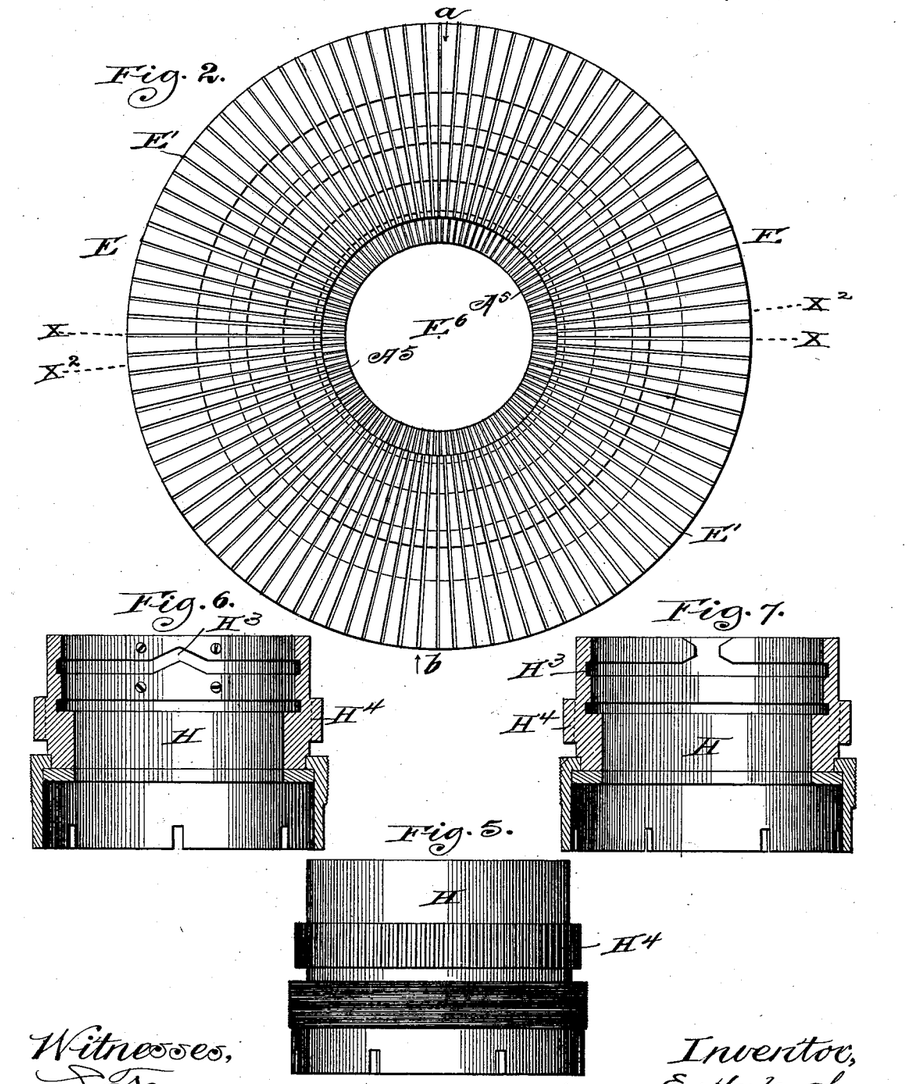
Fig. 2 is a like view of the needle-bed and hook-jack cylinder of the same.
Fig. 5 is an elevation of the hook-jack cam-ring.
Figs. 6 and 7 are vertical opposite sections of the same.
Figure 3:
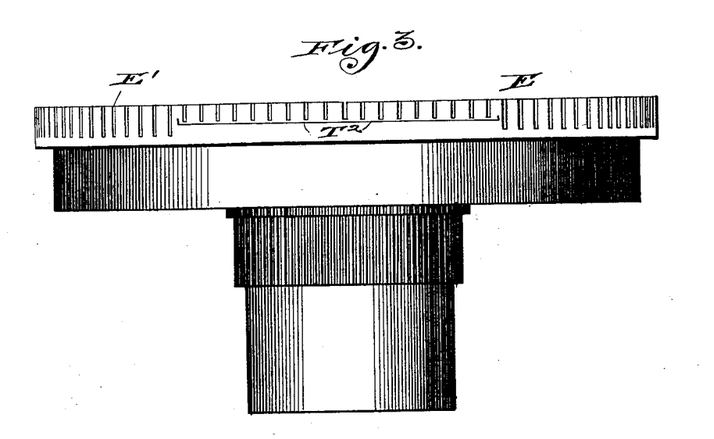
Figs. 3 and 4 are elevations of the latter as seen from $a$ and $b$, in Fig. 2, respectively.
Figures 4, 12:
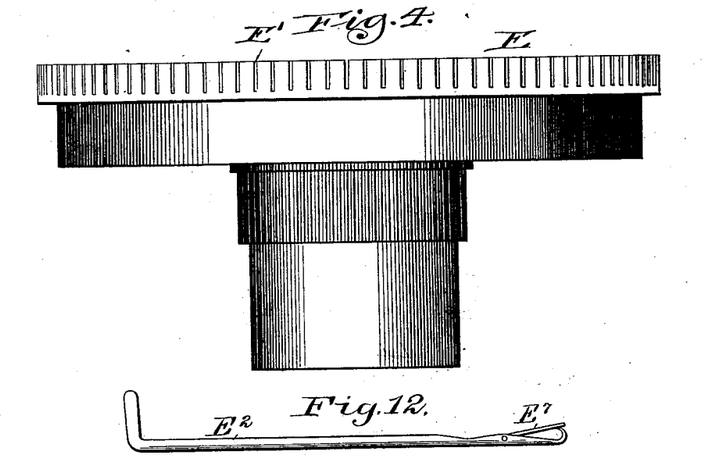
Fig. 12 is an enlarged view of one of the machine-needles.

The base A of the machine-head has holes A' therein, arranged in two series of equal numbers—see Fig. 1—to admit the passage of sub-jack pins therethrough. The base A also has holes $A^2$ therein to admit the passage of sub-jack-lifting-ring lifting-pins therethrough.

B is a reciprocatory cam-ring, consisting of a more elevated portion B', a less elevated portion $B^2$, and an inclined portion $B^3$ extending between the more and less elevated portions B' $B^2$ thereof. The reciprocatory ring B also has a portion of its periphery provided with teeth $B^4$ and is mounted on an annular flange $A^3$ on the base A of the machine-head.

Figure 17:
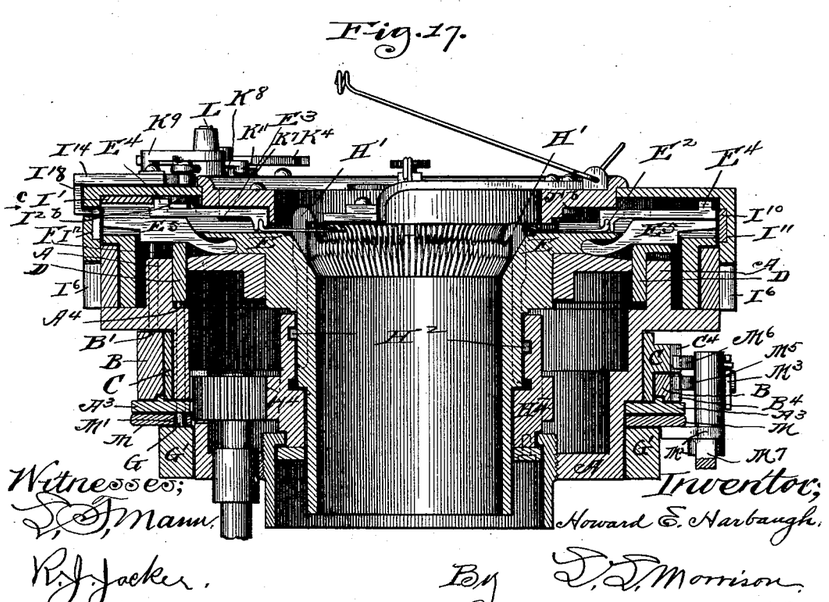
Figs. 17 and 18 are vertical sections, at the dotted lines X X in Fig. 2 and X' X' in Figs. 15 and 16, of the head of the knitting-machine, showing the needles, jacks, sub-jacks and some other parts, in different positions—in the two views.
Figure 18:
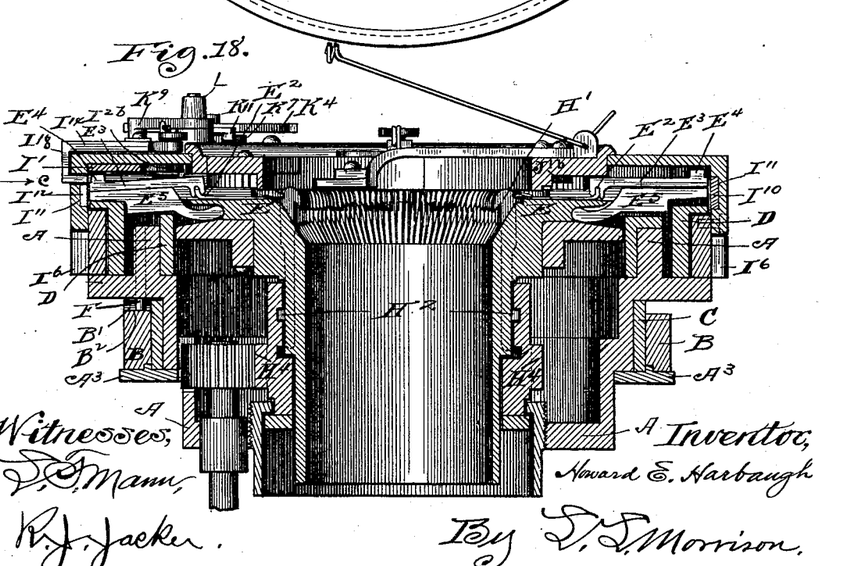
Figure 19:
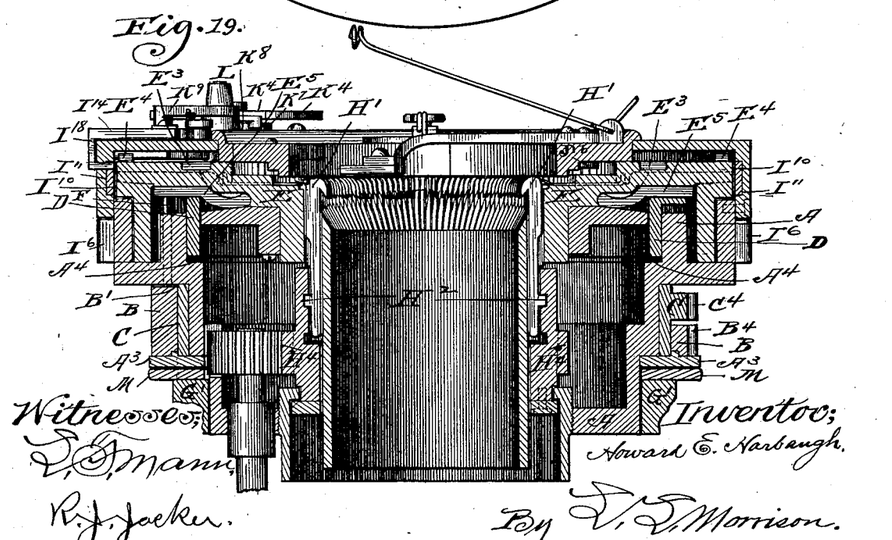
Fig. 19 is a vertical section of the same, at the dotted line $X^2$ $X^2$ in Fig. 2.
Figure 20:
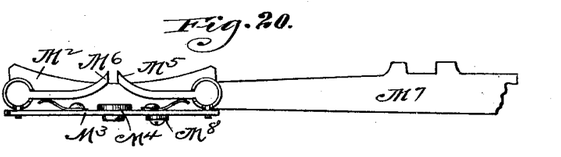
Figs. 20 and 21 are a top plan view and an elevation of double pallets that operate the reciprocatory rings—shown in Figs. 9 to 11 inclusive—in opposite directions.
Figure 21:
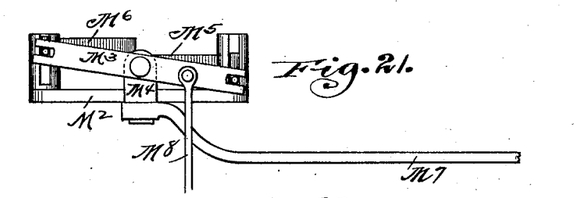
Figure 22:
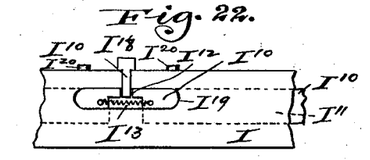
Fig. 22 is an elevation of a fragment of the needle-jack-actuating cam-ring as seen from $c$ in Fig. 15.
Figure 23:
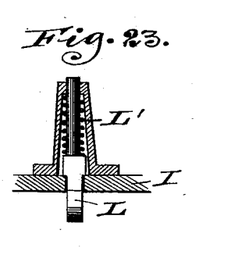
Fig. 23 is a view of a vertical partial section at the dotted line $X^3 X^3$ in Fig. 15.
Figure 24:
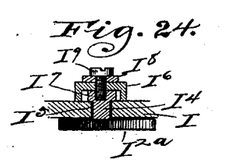
Fig. 24 is a view of a vertical partial section at the dotted line $X^4 X^4$ in Fig. 15.
Figure 25:
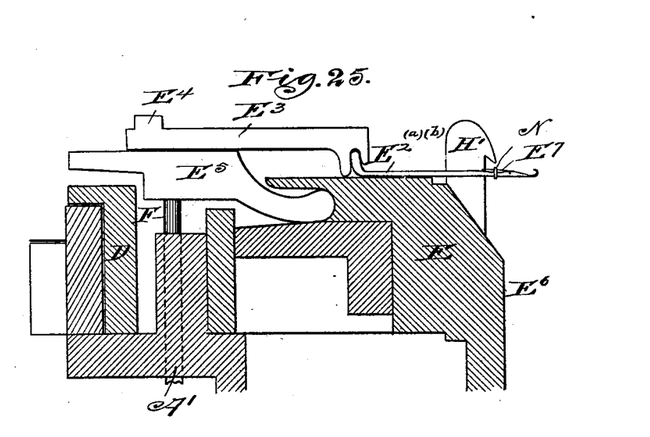
Figs. 25 to 28 inclusive illustrate a series of operations that will be fully described hereinafter.

C is a reciprocatory cam-ring consisting of a more elevated portion C', a less elevated portion C², and an inclined portion C³ extending between the more and less elevated portions C', C² thereof. The reciprocatory ring C is also mounted on the flange A³ inside of and concentric with the reciprocatory ring B.

C⁴ is a toothed segment fast to the reciprocatory ring C and located immediately over the toothed portion B⁴ of the reciprocatory ring B, when both rings are mounted in operative position and relation, as in Figs. 17, 18 and 19. The reciprocatory cam-rings B and C may both be simultaneously turned on their bearing A³ in opposite directions.

D is a sub-jack-lifting-ring resting, while inoperative, in a circular bearing A⁴ in the base of the machine-head A, and of diminished peripheral diameter at D' D² for a purpose that will be stated hereinafter. The only motion of which this ring is capable is vertical reciprocation.

E is a needle-bed having a series of radial slots E' therein.

In each of the radial slots E', in the needle-bed E, is a needle E², to the foot of which is hinge-jointed a needle-jack E³, which is provided with a lug or heel E⁴, and slides upon and is supported by a sub-jack E⁵, the latter having a suitable bearing for the inner end thereof in the needle-bed E.

All the needles in the machine have one function in common, which is that of knitting round-and-round while forming the leg and straight part of the foot of a stocking; a part of them also have an additional function, that of forming the heel and toe of a stocking; while operating in the last-mentioned capacity they are usually termed fashioning-needles.

F, Figs. 17, 18, 25 to 28, are sub-jack lifting-pins, which correspond in number with the holes A' in the machine-head base A. The sub-jack lifting-pins F rest on end, one half upon the upper edge of the reciprocatory ring B, and one half upon the upper edge of the reciprocatory ring C, projecting upward through the holes A' in the part A, past the sub-jack-lifting-ring D at D' D², against the bottoms of the sub-jacks E⁵.

G are sub-jack-lifting-ring lifting-pins, which correspond in number with the holes A², in the part A, through which they are inserted to actuate the sub-jack-lifting-ring D when requisite.

G' is a reciprocatory ring connected with and operated by a pattern-wheel (not shown), and mounted on the frame (not shown) of the machine, and provided with cam-notches G², in the upper end thereof, to admit the sub-jack-lifting-ring lifting-pins G.

H is a hook-jack-cam-ring, mounted in the machine-head.

H' are hook-jacks provided with lugs or heels H², which enter and traverse the annular cam-way H³, in the hook-jack-cam-ring H. The hooks of the hook-jacks H' project upward through and above vertical slots A⁵ in the needle-bed E, wherein said hook-jacks may be vertically reciprocated.

H⁴ is a gear, whereby the hook-jack-cam-ring H may be rotated or oscillated according as required.

Figure 16:
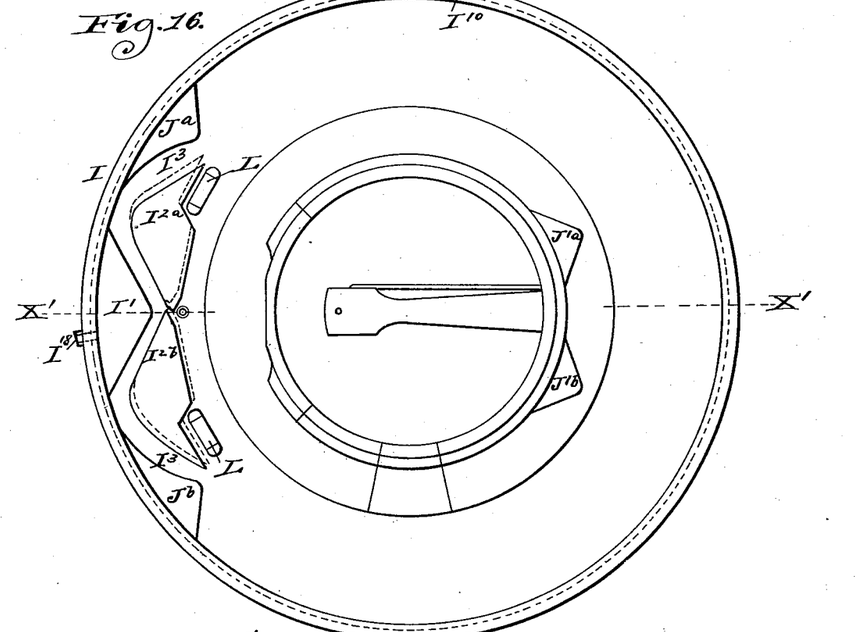

I, Figs. 16 to 19 inclusive, is a needle-jack-actuating-cam-ring, provided, as shown in Fig. 16, with a stationary cam I' and reciprocatory knitting-cams I²ᵃ I²ᵇ, which together form a cam-way I³, which, as the cam-ring is actuated, engages with the lugs E⁴, projecting from the upper edges of the outer ends of the needle-jacks E³, and thus actuate said needle-jacks and the needles attached thereto. The cams I²ᵃ I²ᵇ, during the revolutions and oscillations of the cam-ring I, are reciprocated at stated intervals, as indicated by dotted lines in Fig. 16, by means of mechanism that will now be described.

I⁴ are studs inserted through slots I⁵ in the cam-ring I and rigidly secured to the upper sides of the reciprocatory cams I²ᵃ I²ᵇ. The studs I⁴ may be freely slid back and forth lengthwise of the slots I⁵.

I⁶ are caps that also slide freely on the top of the cam-ring I and are rigidly secured to the heads I⁷ of the studs I⁴, by means of washers and screws I⁸ I⁹. The heads I⁷ of the studs I⁴ and the caps I⁶ slide along the top of the cam-ring I and provide bearings for the cams I²ᵃ I²ᵇ.

I¹⁰ is a friction-ring, set in an annular groove I¹¹ on the inside of the cam-ring I in such a manner as to be capable of being freely oscillated therein, but fitting closely enough to the periphery of the needle-bed E to be oscillated less freely thereon. This friction-ring I¹⁰ is cleft vertically at I¹², and any slack arising from wear between the inside thereof and the periphery of the needle-bed E is taken up by the spring I¹³.

I¹⁴ is a lever pivoted by its inner end at I¹⁵, and is provided with cams I¹⁶ projecting laterally therefrom against the inclines I¹⁷ on the caps I⁶. The outer end I¹⁸ of the cam-lever I¹⁴ projects through the horizontal slot I¹⁹ in the cam-ring I into the cleft I¹² in the friction-ring I¹⁰. Whenever the cam-ring I is rotated or oscillated, the friction between the periphery of the needle-bed E and the inside of the friction-ring I¹⁰ detains the latter and the outer end of the lever I¹⁴ until the cams I²ᵃ I²ᵇ are thrown by the cams I¹⁶ into the relative positions shown in Fig. 16. Obviously a reverse motion of the cam-ring I would reverse the positions of the cams I²ᵃ I²ᵇ. The effect of the operation just noted is to alternately widen one end and narrow the other of the cam-way I³. As soon as the lever I¹⁴ strikes either of the stops I²⁰ the friction-ring I¹⁰ revolves with the cam-ring I until the motion of the latter is reversed. The lugs E⁴ of the needle-jacks E³ enter the cam-way I³ at its wide end, but the machine knits only in the half of the same to which the narrow portion pertains.

Jᵃ Jᵇ are needle-advancing cams.

Figure 26:
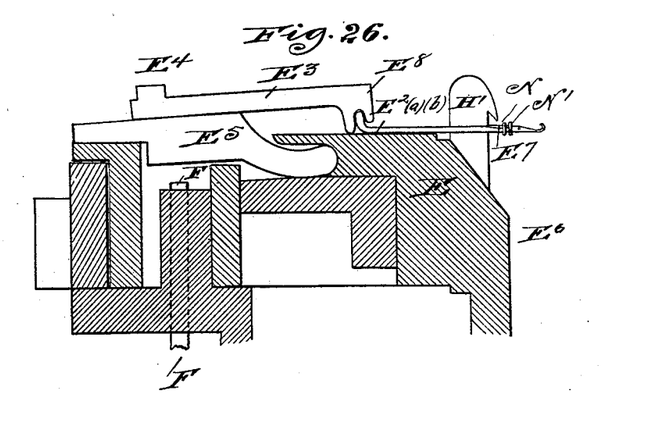
Figure 27:
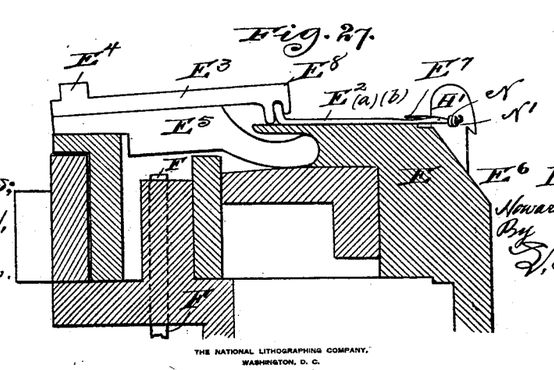
Figure 28:
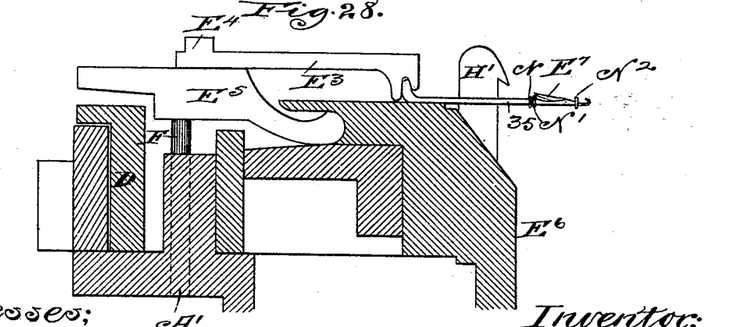
Figure 29:
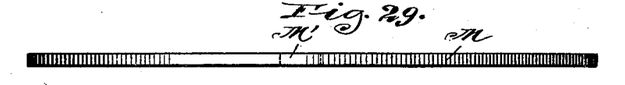
Figures 30, 31:
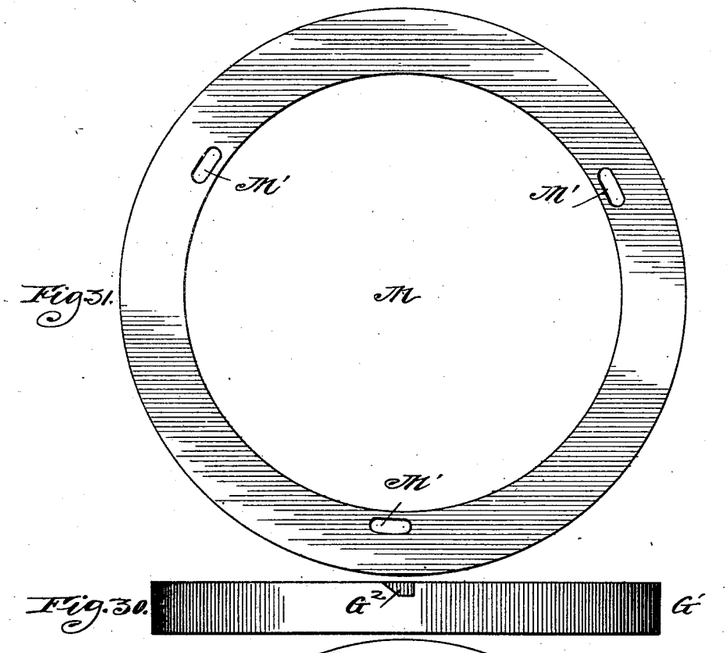
Figure 32:
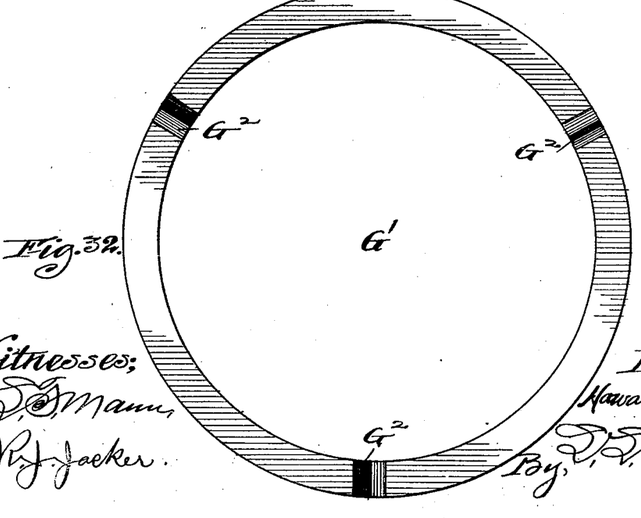

$J'^a$ $J'^b$ are cams for retiring the fashioning-needles after their jacks have been disconnected from the cam-way $I^3$. The cams $J'^a$ $J'^b$ retire the fashioning-needles—after they have been disconnected from the cam-way $I^3$—by the descent of the outer ends of the needle-jacks $E^3$, as shown in Fig. 26—by engaging with the inner ends of the said needle-jacks and sliding them outward to the position shown in Figs. 18 and 27.

The reciprocatory cams $I^{2a}$ $I^{2b}$, needle-advancing cams $J^a$ $J^b$, and needle-retiring cams $J'^a$ $J'^b$ are all vital elements of my invention, and their functions and modes of operation will be fully explained hereinafter. The periphery of the cam-ring I is also provided with teeth $I^6$, to adapt it to engage with a pinion (not shown) which imparts a rotary or oscillatory motion thereto according as required.

K is a ratchet-wheel mounted on the cam-ring I, by means of a pivot $K'$.

$K^2$ is a lever provided with arms $K^3$ $K^4$ and also mounted, independently of the ratchet-wheel K, on the pivot $K'$.

$K^5$ is a pallet for driving the ratchet-wheel K, and is mounted on the under side of the lever-arm $K^3$.

$K^6$ is a spring-actuated detent for locking the ratchet-wheel K as it is turned on its pivot.

$K^7$ is an eccentric, fast to the ratchet-wheel K and having a slot $K^8$ in the periphery thereof.

$K^9$ is a lever, pivoted to the cam-ring I at $K^{10}$, connected at one end, through one of the caps $I^6$, to the reciprocatory-cam $I^{2b}$, by means of a hinge-joint, and provided at the other end with a downwardly-projecting lug $K^{11}$ adapted to drop into the slot $K^8$ in the eccentric $K^7$ and to traverse the periphery of the latter as the same and the ratchet-wheel are revolved.

Figure 15:
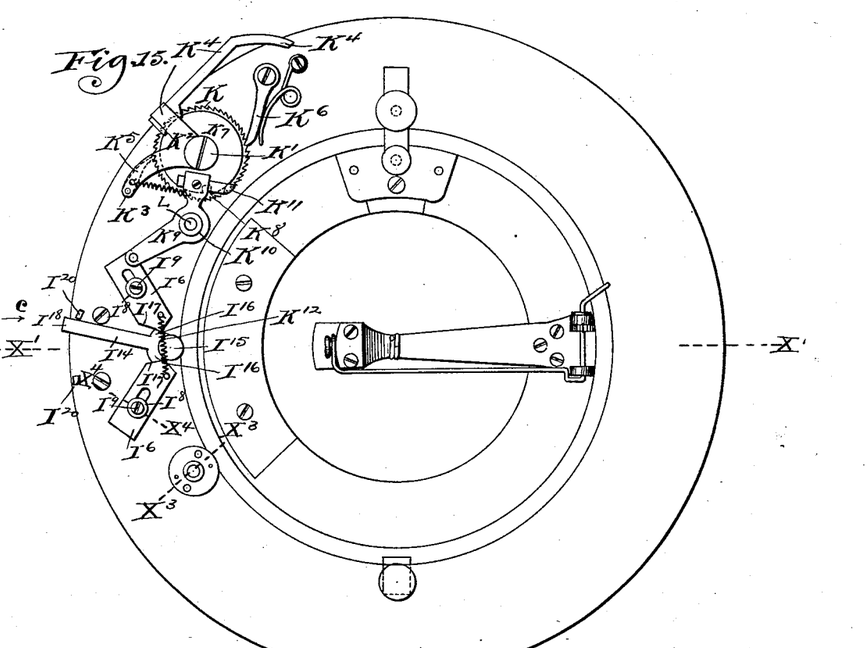
Figs. 15 and 16 are top and bottom plan views, respectively, of the needle-jack-actuating cam-ring.
Figure 33:
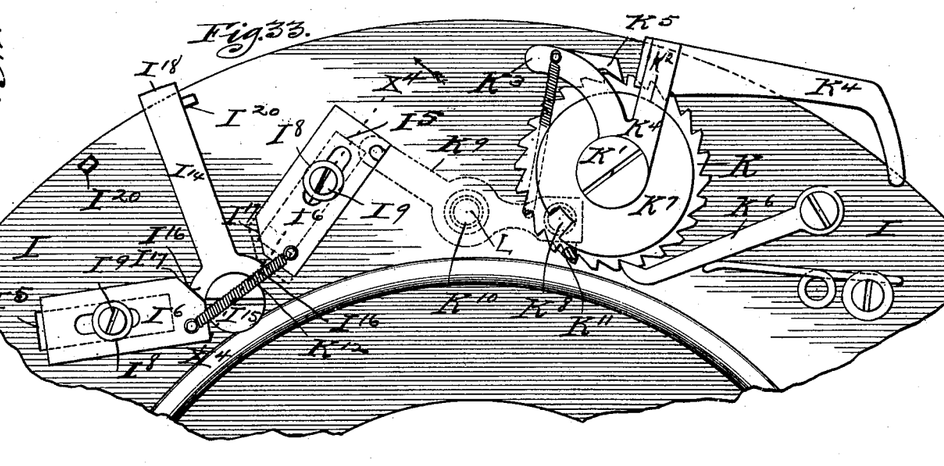
Fig. 33 is a top plan view of a fragment of the cam-ring shown in Fig. 15.
Figure 34:
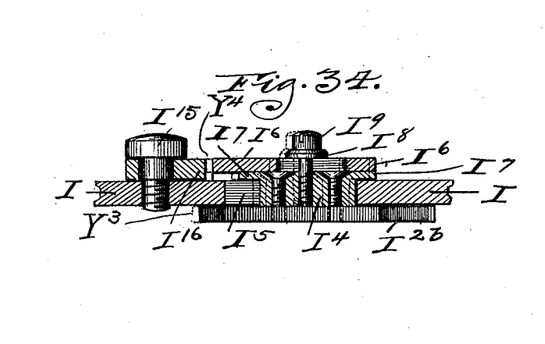
Fig. 34 is a vertical section, at the dotted line $X^4 X^4$ in Fig. 33, of parts there shown.
Figure 35:
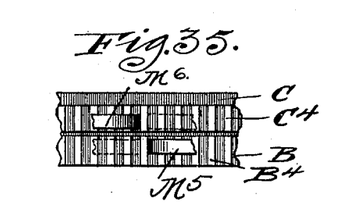
Fig. 35 is an elevation of two fragments of the toothed portions of the reciprocatory rings, shown in Figs. 8 to 11 inclusive—in operative position and illustrating the manner in which their driving-pallets are shifted from one to the other, preparatory to reversing their motions.

The purpose of the combined devices just described is to enable the machine to knit loosely in the upper part of the leg of a stocking, then gradually tighter until the heel is reached, and thereafter uniformly tight through the straight part of the foot thereof. This is accomplished by acting upon the reciprocatory-cam $I^{2b}$, which does all the round and round knitting as the cam-ring I revolves from right to left while knitting the legs and straight parts of the feet of stockings. When the lug $K^{11}$ is in contact with the most eccentric part of the periphery of the ratchet-wheel K—as it is in Figs. 15 and 33 of the drawings—the cam $I^{2b}$ next thereto is forced, by the lever $K^9$ as near to the periphery of the cam-ring I as it can be made to go—see Figs. 16, 33 and 34—and if the latter be then revolved, the machine will knit as loosely as it can be made to do. After the upper portion of the leg of the stocking has been knit the required length, a pattern-wheel (not shown) causes a lug to be projected into the path of the lever $K^4$, thereby causing the pallet $K^5$, Fig. 33, to drive the ratchet-wheel K forward one notch. This operation is repeated at each revolution of the cam-ring I until the ratchet-wheel K has performed nearly one revolution. As the diameter of the eccentric $K^7$ decreases from the point of its greatest eccentricity, obviously, as the periphery thereof passes the lug $K^{11}$, the cam $I^{2b}$, actuated by the spring $K^{12}$—which constantly actuates both of the cams $I^{2a}$ $I^{2b}$ toward the cams $I^{16}$, Figs. 15 and 33—will move very slowly toward the center of the cam-ring I—as indicated by dotted lines near the cam $I^{2b}$ in Fig. 16 and by the dotted lines $Y^3$ $Y^4$ Fig. 34—and the diameter of the leg of the stocking will steadily diminish as the result of such movement of said cam $I^{2b}$, until the point of least eccentricity on the periphery of the eccentric $K^7$ has passed the lug $K^{11}$, at which time the cam $I^{2b}$ will have reached the position indicated by the dotted line $Y^3$ in Fig. 34, which is the limit of its motion toward the center of the cam-ring I. Immediately after that point has been reached, the lug $K^{11}$ will drop into the slot $K^8$ in the periphery of the eccentric $K^7$, where it will remain until the stocking is finished, the foot whereof, as already stated, will be knit as tightly as the machine admits of, by virtue of the relative positions of said eccentric $K^7$ and lug $K^{11}$. While the machine is knitting to-and-fro, to form the heels and toes of stockings, the lever $K^9$ is caused to reciprocate—idly—by the action of the friction-ring $I^{10}$, cam-lever $I^{14}$ and caps $I^6$. The slot $K^8$ in the periphery of the eccentric $K^7$ allows the lug $K^{11}$ to reciprocate with its lever $K^9$ without striking said eccentric $K^7$. This is the only office of the slot $K^8$.

The reciprocatory-cams $I^{2a}$ $I^{2b}$ knit alternately once across, in forming the heels and toes of stockings, the cam $I^{2a}$ knitting when the cam-ring I is oscillated to the right, and the cam $I^{2b}$ knitting when it is oscillated to the left. The first cam—$I^{2a}$ or $I^{2b}$ as the case may be—that the lugs $E^4$ of the needle-jacks $E^3$ approach, when knitting the heels and toes of stockings, is caused, by the joint operation of the friction-ring $I^{10}$, lever $I^{14}$, caps $I^6$ and spring $K^{12}$ to recede toward the center of the cam-ring I, to widen the cam-way $I^3$ at that entrance, so as to readily admit said lugs $E^4$ thereinto. The operation of the parts $I^{10}$ $I^{14}$ $I^6$ and $K^{12}$ just noted also causes the other cam—$I^{2a}$ or $I^{2b}$ as the case may chance to be—to advance a corresponding distance toward the periphery of the cam-ring I. The last-mentioned cam always does the knitting—that is the cam nearest to the periphery of the cam-ring I always does. Evidently, reversing the motion of the latter would simultaneously reverse the positions of the cams $I^{2a}$ $I^{2b}$.

L are two presser-feet, actuated downwardly by means of springs $L'$, which press the needle-jacks $E^3$ down into the radial slots $E'$ in the needle-bed E, out of range of the knitting-cams after the sub-jack-lifting ring D has descended to the position shown in Fig. 18.

M is a reciprocatory ring, having slots $M'$ therein to admit the passage of the sub-jack-lifting-ring lifting-pins G therethrough, and being mounted on the reciprocatory ring G'. The sole office of the ring M is to furnish a reciprocatory bearing for the parts now to be described.

$M^2$ is a bracket rigidly connected with the reciprocatory ring M.

$M^3$ is a vertically oscillatory lever, centrally mounted on a lug $M^4$ on the bracket $M^2$.

$M^5$ and $M^6$ are pallets—pivot-jointed to the outer ends of the lever $M^3$—one of which engages with the toothed portion $B^4$ of the reciprocatory ring B, and the other with the toothed portion $C^4$ of the reciprocatory ring C.

$M^7$ is an arm—actuated in any suitable manner—for horizontally reciprocating the ring M, which reciprocation alternately operates the pallets $M^5 M^6$, thereby alternately driving the rings B C in opposite directions.

$M^8$ is a rod, controlled by the pattern-wheel of the machine, for oscillating the lever $M^3$, each oscillation of which causes each of the pallets $M^5 M^6$ to shift from its engagement with its ring—B or C, as the case may chance to be—into engagement with the other ring. The needles included in the brace T, Fig. 14, all go into and out of action at once. The needles included in the brace T', Fig. 14, never go out of action.

Figure 14:
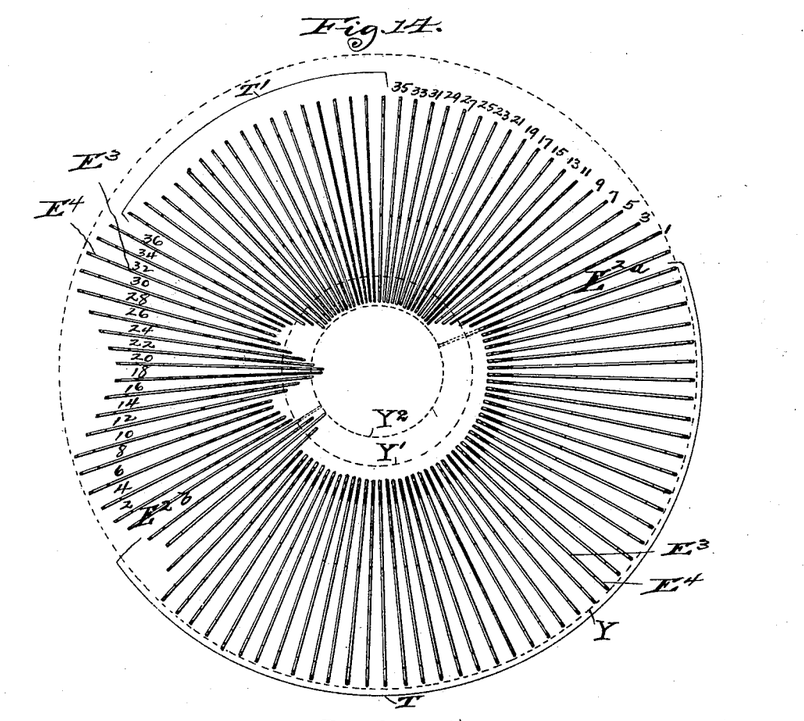
Fig. 14 is a top plan view of the needles and needle-jacks of the machine detached from their bed.

The dotted lines Y Y', Fig. 14, indicate the positions of the periphery and the central opening $E^6$ of the needle-bed E, when its needles and needle-jacks are in operative positions therein.

Figure 8:
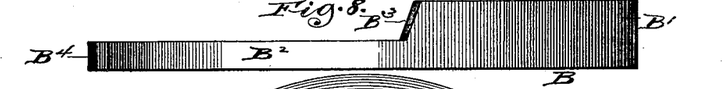
Figs. 8, 9, 10 and 11 are elevations and top plan views of reciprocatory rings for actuating sub-jack pins.
Figure 9:
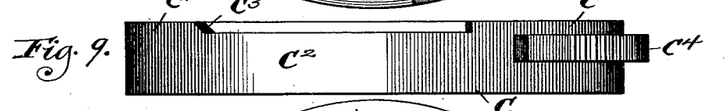
Figure 10:
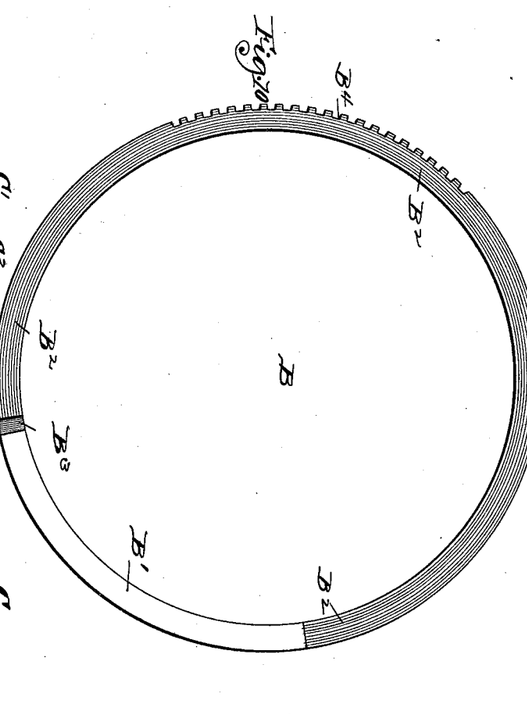
Figure 11:
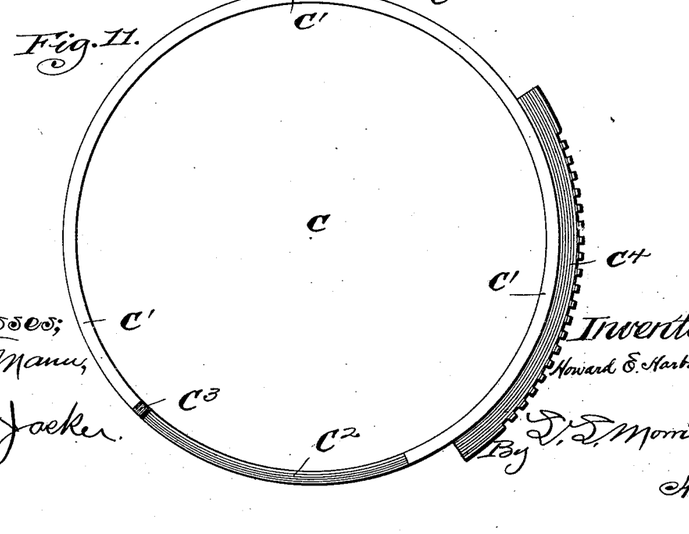
Figure 13:
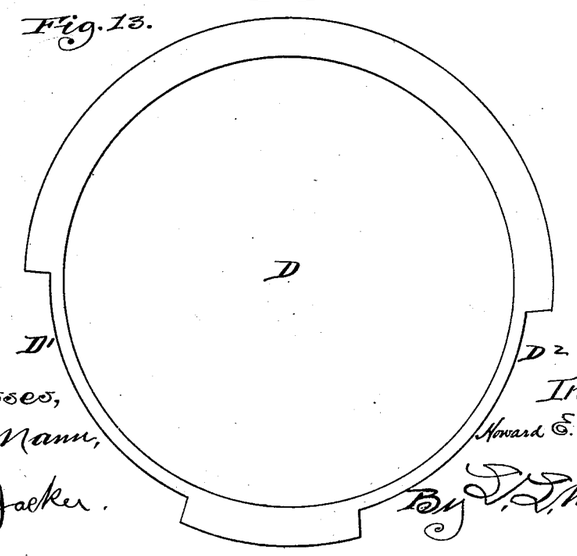
Fig. 13 is a plan view of a sub-jack lifting-ring.

Figs. 17 and 19 show the machine with all of its parts in proper operative positions and relations to knit the leg and straight part of the foot of a stocking—that is, the sub-jack-lifting-ring D is supporting the sub-jacks $E^5$ and needle-jacks $E^3$ in the most elevated positions that they can be made to assume in the machine. The result of this is that the lugs $E^4$ on the needle-jacks $E^3$ are in position to engage with the cam-way $I^3$ of the cam-rign I. As long as the latter and hook-jack cam-ring H are synchronously rotated, the machine will knit round-and-round. During the round-and-round knitting the reciprocatory rings B C M and C' are all inoperative, and the sub-jack lifting-pins F are all resting on the elevated portions B' C' of the reciprocatory rings B C, one half of them on each of said rings. The upper ends of the sub-jack lifting-pins F are in contact with the under edges of the sub-jacks that support the needle-jacks that are connected with the needles $E^{2a} E^{2b}$ and 1 to 36 inclusive, in Fig. 14. The sub-jack-lifting-ring lifting-pins G rest on the more elevated portions of the reciprocatory ring G' and support the sub-jack-lifting-ring D in the elevated position to which reference has just been made. When the leg of a stocking is finished, the reciprocatory ring G' turns sufficiently to cause the sub-jack-lifting-ring lifting-pins G to drop down into the cam-notches $G^2$ therein. The dropping down of these lifting-pins G allows the sub-jack-lifting-ring D to descend to the position shown in Fig. 18, leaving however the sub-jacks $E^5$, that support the needle-jacks $E^3$, that operate the needles $E^{2a} E^{2b}$ and 1 to 36 inclusive, Fig. 14, supported by the sub-jack lifting-pins F, in the same positions they were before the sub-jack-lifting-ring D descended. The presser-feet L, immediately after the descent of the sub-jack-lifting-ring D, ride along over the upper edges of the needle-jacks $E^3$—that operate the needles included by the brace T, Fig. 14, and were supported by the sub-jacks $E^5$, that were in turn supported by the sub-jack-lifting-ring D before its descent—and press them and the sub-jacks $E^5$ down into the position shown on the left side of the machine in Fig. 18, which position leaves them fully retired and out of action. The cam-ring I then commences to oscillate, and at the first oscillation thereof, all the needles that have not gone out of action knit one stitch each. Just before the first oscillation of the cam-ring I is completed, the needle-advancing-cam $J^a$, Fig. 16, engages with the lug $E^4$ on the needle-jack $E^3$ of the needle $E^{2a}$, Figs. 14 and 25, and advances the hook-end thereof—toward the center of the opening $E^6$ in the needle-bed E and to the dotted circle $Y^2$ in Fig. 14—sufficiently to open the latch $E^7$ thereof, Fig. 25, and slide it under the stitch N thereon, which stitch the hook of this needle received the last time that it knit. At the same moment the pallet $M^5$ turns the reciprocatory ring B one tooth $B^4$, which causes the first one of the first series of the sub-jack lifting-pins F to descend from the more elevated portion B' thereof, Fig. 8, down the incline $B^3$ onto the less elevated portion $B^2$ of the same. The result of the descent of said sub-jack lifting-pin F is to allow one of the presser-feet L to depress the sub-jack $E^5$ and the needle-jack $E^3$, that operated the needle $E^{2a}$, Fig. 14, to the position shown in Fig. 26, in which position the cam-way $I^3$ of the cam-ring I cannot engage with the lug $E^4$ thereon. The advanced needle $E^{2a}$, Fig. 14, is thus left projecting into the central opening $E^6$ in the needle-bed E as far as the circle Y in Fig. 14—which is the same position as that shown in Fig. 26—and the cam-ring I, at the beginning of its second oscillation, will leave a second loop or stitch N', Fig. 26, on the needle $E^{2a}$, Figs. 14 and 26. About the middle of the second oscillation of the cam-ring I, the needle-retiring cam $J'^a$, Fig. 16, engages with the front end $E^8$, Fig 26, of the needle-jack $E^3$ and retires it with its needle $E^{2a}$, to the position shown in Figs. 18 and 27. As the second oscillation of the cam-ring I is about to terminate, the needle-advancing cam $J^b$ engages with the lug $E^4$ on the needle-jack $E^3$ of the needle $E^{2b}$, Fig. 14, and advances the hook-end thereof—toward the center opening $E^6$ in the needle-bed E as far as the circle $Y^2$—sufficiently to open the latch $E^7$, thereof, Fig. 25, and slide it under the stitch N thereon. At the same moment the pallet M⁶ turns the reciprocatory ring C one tooth C⁴, which causes the first one of the second series of the sub-jack lifting-pins F to descend from the more elevated portion C' thereof, Fig. 9, down the incline C³ onto the less elevated portion C² of the same. The result of the descent of the last-mentioned sub-jack lifting-pin F is to allow the other presser-foot L to depress the sub-jack E⁵ and the needle-jack E³, that operated the needle E²ᵇ, Fig. 14, to the position shown in Fig. 26, in which position the cam-way I³ of the cam-ring I cannot engage the lug E⁴ thereon. The advanced needle E²ᵇ, Fig. 26, is thus left projecting into the central opening E⁶ in the needle-bed E as far as the circle Y² in Fig. 14—which is the same position as that shown in Fig. 26—and the cam-ring I, at the beginning of its third oscillation, will leave a second loop or stitch N', Fig. 26, on the needle E²ᵇ, Figs. 14 and 26. About the middle of the third oscillation of the cam-ring I, the needle-retiring cam Jᵇ, Fig. 16, engages with the front end E⁸, Fig. 26, of the needle-jack E³ and retires it with its needle E²ᵇ to the position shown in Figs. 18 and 27. Each of the remaining fashioning-needles, from 1 to 36 inclusive, Fig. 14, is next operated in the order that they are there numbered, in precisely the same manner that the needles E²ᵃ E²ᵇ have been operated, and each takes two stitches before they are retired. The needle numbered 36, Fig. 14, is the last to retire. The sub-jack lifting-pins F have now all descended to the less elevated portions B² C² of the reciprocatory rings B C. Immediately after the retirement of the needle 36, the rod M⁸ oscillates the lever M³ and causes the pallet M⁵ to disengage from the teeth B⁴ of the reciprocatory-ring B, and pass into engagement with the teeth C⁴ of the reciprocatory-ring C. The pallet M⁶ also passes from its engagement with the reciprocatory-ring C into engagement with the reciprocatory-ring B synchronously with the passage of the pallet M⁵ just noted. The movements of the reciprocatory-rings B C will now be reversed by the operation of their pallets. The pallet M⁶ will now turn the reciprocatory-ring B one tooth B⁴, and the sub-jack lifting-pin F, that stands below the sub-jack E⁵ and needle-jack E³ that operated the needle 35, Fig. 14, will ascend the incline B³ to the more elevated portion B' of the reciprocatory-ring B, carrying its sub-jack and needle-jack up with it, to the position from which it started to descend. The result will be, that the cam-way I³ of the cam-ring I will now engage with the lug E⁴ of the needle-jack that operates the needle 35, Fig. 14, and push it forward until the stitches N N', Fig. 28, that it received before it retired, pass over and release the latch E⁷. Another stitch N² will then be received by the needle 35, Figs. 14 and 28, and drawn or knit through the two stitches N N', Fig. 28, by the operation of the cam I²ᵃ upon the needle-jack E³ of said needle 35. The needle 36, Fig. 14, is operated in like manner by the reciprocatory ring C and cam I²ᵇ. The remaining needles, that went out of action with two stitches on them, will now all return in the reverse order of their going out. The heel of the stocking will then be finished.

In order that the different operations of all the needles of the machine and their different relative positions at different times may be more readily understood, attention is again invited for further explanation, to Fig. 14, which shows all the needles of the machine just as they appeared when the cam-ring I was removed to make said view, and all the needles included in the brace T were also out of action, and the three needles at the extreme left of the brace T were in the positions indicated. All the needles outside of the brace t were likewise in the positions shown and in action. The cam-way I³ had left the three needles to the right of, and the fifteen needles to the left of, the needle E²ᵇ in the positions shown. The first motion of the cam-ring I—after the needles in the brace T went out of action, and which would be only a partial revolution—would advance the needle E²ᵃ, and also the needles 1, 3, 5, 7 and 9, to the dotted circle Y², at the same time idly changing the positions of all the other needles outside of the brace T. In fact, all the needles, except needle E²ᵃ, in the operation just supposed to have taken place, changed positions idly. The next motion of the cam-ring I would be in a direction opposite to that just noted and would move all the needles, outside of the brace T, except needle E²ᵃ, projecting the needle E²ᵇ inward to the dotted circle Y². During the two movements, just supposed to have taken place, all the needles included between needles E²ᵃ and E²ᵇ will have traveled idly.

The effect of the two-looped stitches, knit by this machine, is to entirely fill and close up the series of openings that occur along the center lines of the gusset-seams of the toes and heels of stockings as knit on the Bridges machine hereinbefore mentioned. After the last sub-jack lifting-pin F has returned to the more elevated portion of its reciprocatory-ring, the ring G' turns and drives the sub-jack-lifting-ring lifting-pins G up the inclines G² therein onto the more elevated portions thereof. The result of this is to force the sub-jack-lifting-ring D up against the sub-jacks E⁵ and thereby elevate the needle-jacks E³—that controlled the needles included in the brace T, in Fig. 14, when they went out of action, preparatory to the commencing to knit the heel of the stocking—until their lugs will engage with the cam-way I³ of the cam-ring I. The machine will then knit round-and-round until the straight part of the foot of the stocking is formed. The toe of the stocking is knit in precisely the same manner as the heel thereof.

The toes and heels of stockings knit on my improved machine are much firmer and stronger, along their gusset-seams than those knit on the Bridges machine.

I claim—

1. In a knitting-machine, in combination, the needle-bed and its needles, the needle-jacks connected to the needles, the needle-advancing-cams for carrying certain needles inward preparatory to their receiving a second series of loops or stitches and the cam-ring provided with knitting cams, substantially as and for the purpose specified.

2. In a knitting-machine, in combination, the needle-bed and its needles, the needle-jacks connected to their needles, means for actuating certain needles so as to place them in positions to have two loops placed thereon together, the needle-retiring cams for withdrawing said certain needles after they have received two loops or stitches and the cam-ring provided with knitting-cams, substantially as and for the purpose specified.

3. In a knitting-machine, in combination, the needle-bed and its needles, the knitting-cams, the needle-jacks connected with the needles and adapted to be alternately thrown into and withdrawn from engagement with the knitting-cams, the needle-advancing cams, the needle-retiring-cams and a cam-ring for supporting and operating all of said cams, substantially as and for the purpose specified.

4. In a knitting-machine, in combination, the needle-bed, the cam-ring provided with reciprocatory knitting-cams, the friction-ring set into an annular groove on the inside of the cam-ring, in such a manner as to be capable of being freely oscillated therein and fitting closely enough to the periphery of the needle-bed to be less freely oscillated thereon, and the lever operatively connecting the reciprocatory knitting-cams and friction-ring, substantially as and for the purpose specified.

5. In a knitting-machine, in combination, the devices for regulating the length of the stitch-loops comprising the cam-ring, a reciprocatory-cam thereon, an eccentric and ratchet-wheel rigidly connected together and mounted on the cam-ring, a centrally-pivoted lever, having a pivot-joint connection at one end with the reciprocatory cam and being provided at the other end with a lug adapted to regulate said lever by traversing the eccentric, and a pallet for driving the ratchet-wheel and eccentric, when all of said parts are operatively arranged and connected, substantially as and for the purpose specified.

HOWARD E. HARBAUGH.

Witnesses:
L. L. MORRISON,
E. F. DOWLING.